US012450209B2

(12) United States Patent
Vasa et al.

(10) Patent No.: US 12,450,209 B2
(45) Date of Patent: Oct. 21, 2025

(54) MACHINE LEARNING-BASED DETERMINATION OF TARGET DATABASE SIZE FOR DATABASE MIGRATION OPERATIONS

(71) Applicant: Dell Products L.P., Round Rock, TX (US)

(72) Inventors: Rajesh Kumar Reddy Vasa, Bangalore (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 25 days.

(21) Appl. No.: 18/110,685

(22) Filed: Feb. 16, 2023

(65) Prior Publication Data
US 2024/0281416 A1 Aug. 22, 2024

(51) Int. Cl.
*G06F 16/21* (2019.01)
*G06F 16/22* (2019.01)

(52) U.S. Cl.
CPC ........ *G06F 16/214* (2019.01); *G06F 16/2282* (2019.01)

(58) Field of Classification Search
CPC ............................ G06F 16/214; G06F 16/2282
See application file for complete search history.

(56) References Cited

U.S. PATENT DOCUMENTS

| | | | | |
|---|---|---|---|---|
| 10,782,883 B1* | 9/2020 | Henning | ............... | G06F 3/0605 |
| 11,615,061 B1* | 3/2023 | Malik | .................. | G06F 16/214 |
| | | | | 707/602 |
| 2008/0255895 A1* | 10/2008 | Rajamony | ........ | G06Q 10/06313 |
| | | | | 705/7.26 |
| 2018/0247325 A1* | 8/2018 | Melzer | ............... | G06Q 30/0206 |
| 2018/0373456 A1* | 12/2018 | De Schrijver | ........ | G06F 3/0611 |
| 2020/0104376 A1* | 4/2020 | Earnesty, Jr. | ......... | G06F 16/285 |
| 2020/0327372 A1* | 10/2020 | Anschuetz | ......... | G06Q 30/0203 |
| 2021/0026707 A1* | 1/2021 | Rosenberg | .......... | G06F 9/45558 |
| 2021/0241131 A1* | 8/2021 | Khawas | .................... | G06N 3/08 |
| 2022/0237154 A1* | 7/2022 | Pal | ........................ | G06F 16/214 |
| 2022/0327032 A1* | 10/2022 | Chang | ................. | G06F 11/1451 |

(Continued)

OTHER PUBLICATIONS

G. K. Uyanik et al., "A Study on Multiple Linear Regression Analysis," Procedia—Social and Behavioral Sciences, vol. 106, Dec. 10, 2013, pp. 234-240.

(Continued)

*Primary Examiner* — Jensen Hu
(74) *Attorney, Agent, or Firm* — Ryan, Mason & Lewis, LLP

(57) ABSTRACT

An apparatus comprises a processing device configured to identify a source database of a first database type that is to be migrated to a target database of a second database type, to determine a set of migration factors for migrating the source database to the target database, and to select a given migration machine learning model for estimating a size required for the target database based at least in part on the first database type of the source database and the second database type of the target database. The processing device is further configured to estimate the size required for the target database utilizing the given migration machine learning model and the determined set of migration factors and to provision, for the target database, a given amount of storage resources based at least in part on the estimated size required for the target database.

21 Claims, 8 Drawing Sheets

(56) References Cited

U.S. PATENT DOCUMENTS

2022/0383324 A1\* 12/2022 Sheshadri ............... H04L 41/16
2022/0391120 A1\* 12/2022 Chandrasekaran ..........................
                                                        G06F 9/45512
2023/0350915 A1\* 11/2023 Ranjan .................. G06F 16/214

OTHER PUBLICATIONS

L. Ashdown et al., "Oracle Database Database Concepts," E96138-06, Apr. 2021, 681 pages.
V. Jain et al., "MongoDB and NoSQL Databases," International Journal of Computer Applications, vol. 167, No. 10, Jun. 2017, pp. 16-20.
V. Sharma et al., "SQL and NoSQL Databases," International Journal of Advanced Research in Computer Science and Software Engineering, vol. 2, No. 8, Aug. 2012, pp. 20-27.
Tutorials Point, "MS SQL Sever." Feb. 1026, 92 pages.
Datastax Corporation, "Introduction to Apache Cassandra," White Paper, Jul. 2013, 11 pages.

\* cited by examiner

MACHINE LEARNING-BASED DETERMINATION OF TARGET DATABASE SIZE FOR DATABASE MIGRATION OPERATIONS

FIELD

The field relates generally to information processing, and more particularly to techniques for managing data.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems, including in migrating legacy systems or applications and their associated data to modern cloud-based information processing systems. Similar challenges arise in other types of information processing systems.

SUMMARY

Illustrative embodiments of the present invention provide techniques for machine learning-based determination of target database size for database migration operations.

In one embodiment, an apparatus comprises at least one processing device comprising a processor coupled to a memory. The at least one processing device is configured to identify a source database of a first database type that is to be migrated to a target database of a second database type, the second database type being different than the first database type, and to determine a set of one or more migration factors for migrating the source database to the target database. The at least one processing device is also configured to select, from a set of two or more migration machine learning models, a given migration machine learning model for estimating a size required for the target database, the given migration machine learning model being selected based at least in part on the first database type of the source database and the second database type of the target database. The at least one processing device is further configured to estimate the size required for the target database utilizing the given migration machine learning model and the determined set of one or more migration factors, and to provision, for the target database, a given amount of storage resources of one or more assets of an information technology infrastructure, the given amount of storage resources being based at least in part on the estimated size required for the target database.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
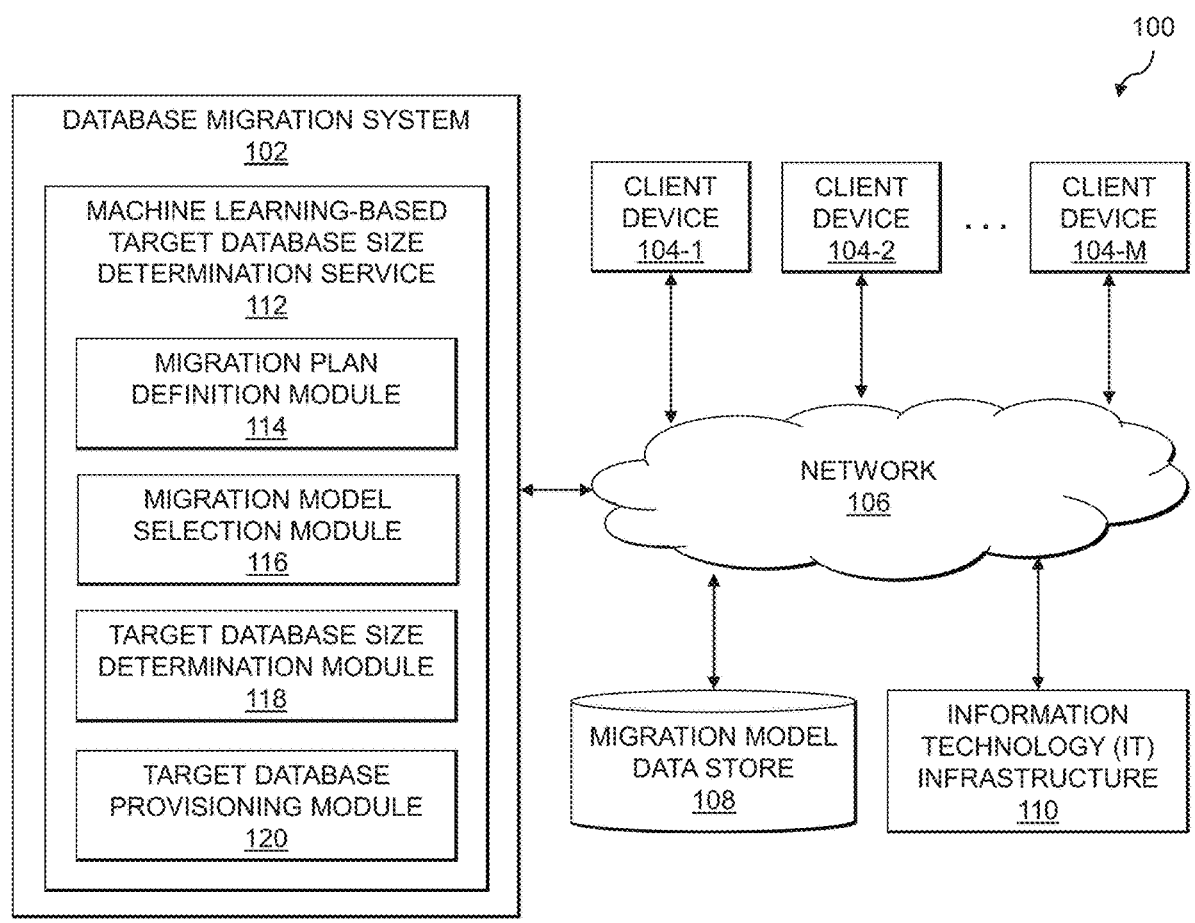
FIG. 1 is a block diagram of an information processing system configured for machine learning-based determination of target database size for database migration operations in an illustrative embodiment of the invention.

FIG. 1 shows an information processing system 100 configured in accordance with an illustrative embodiment to provide functionality for determining target database size for database migration operations. The information processing system 100 includes a database migration system 102 and a plurality of client devices 104-1, 104-2, . . . 104-M (collectively client devices 104). The database migration system 102 and client devices 104 are coupled to a network 106. Also coupled to the network 106 is a migration model data store 108, which may store various information relating to machine learning (ML) models used for assessing a size of a target database for different migration configurations (e.g., different combinations of source and destination database types). The source and target databases for a given database migration operation may comprise or be part of one or more assets of an information technology (IT) infrastructure 110 also coupled to the network 106. The assets may include, by way of example, physical and virtual computing resources in the IT infrastructure 110. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The migration model data store 108, as discussed above, is configured to store and record information relating to different migration ML models used for analyzing and assessing the size of target databases for database migration operations. Such information may include the ML models themselves, migration factors or parameters which are used as input to the ML models, information or characteristics of source and target databases (e.g., connection strings, database types, etc.), etc. The migration model data store 108 in some embodiments is implemented using one or more storage systems or devices associated with the database migration system 102. In some embodiments, one or more of the storage systems utilized to implement the migration model data store 108 comprises a scale-out all-flash content addressable storage array or other type of storage array.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the database migration system 102 and the ML-based target database size determination service 112, as well as to support communication between the database migration system 102, the ML-based target database size determination service 112, and other related systems and devices not explicitly shown.

In some embodiments, the client devices 104 are configured to access or otherwise utilize the IT infrastructure 110. The IT infrastructure 110 may comprise a plurality of assets (e.g., physical or virtual computing resources) of a business, entity or other enterprise. In such cases, the client devices 104 may be associated with a sales team, support personal, system administrators, IT managers or other authorized personnel or users configured to access and utilize the ML-based target database size determination service 112 and the database migration system 102 to perform database migration between source and target database types on different ones of the assets of the IT infrastructure 110. For example, a given one of the client devices 104 may be used to access a graphical user interface (GUI) provided by the ML-based target database size determination service 112 to input parameters for a given database migration operation (e.g., a migration plan, connection strings for source and target databases, user-defined migration factors or parameters, etc.), and to receive recommendations of a size needed for a target database to enable the database migration system 102 (or a user of the given client device 104) to appropriately provision sufficient resources for the target database and to initiate migration from the source to the provisioned target database.

The term "user" herein is intended to be broadly construed so as to encompass numerous arrangements of human, hardware, software or firmware entities, as well as combinations of such entities.

The ML-based target database size determination service 112 may be provided as a cloud service accessible by the client devices 104. In some embodiments, the client devices 104 may implement host agents that are configured for automated transmission of information regarding a particular scenario (e.g., a database migration plan) to the ML-based target database size determination service 112, and to automatically receive a recommendation for the size of the target database that should be provisioned to perform the desired database migration, and to allow the user to select or reject the recommendation and provision the target database accordingly. It should be noted that this recommendation may be optional, and that the target database may be automatically provisioned using the determined size with the ML-based target database size determination service 112 (or database migration system 102). It should be noted that a "host agent" as this term is generally used herein may comprise an automated entity, such as a software entity running on a processing device. Accordingly, a security agent or host agent need not be a human entity.

As shown in FIG. 1, the database migration system 102 comprises the ML-based target database size determination service 112. As will be described in further detail below, the ML-based target database size determination service 112 is configured to utilize machine learning for automatically determining a size needed for migrating a source database (e.g., of a first database type) to a target database (e.g., of a second database type different than the first database type). Although shown as an element of the database migration system 102 in this embodiment, the ML-based target database size determination service 112 in other embodiments can be implemented at least in part externally to the database migration system 102, for example, as a stand-alone server, set of servers or other type of system coupled to the network 106. In some embodiments, the ML-based target database size determination service 112 may be implemented at least in part within one or more of the client devices 104.

The ML-based target database size determination service 112 is assumed to be implemented using at least one processing device. Each such processing device generally comprises at least one processor and an associated memory, and implements one or more functional modules for controlling certain features of the ML-based target database size determination service 112. In the FIG. 1 embodiment, the ML-based target database size determination service 112 comprises a migration plan definition module 114, a migration model selection module 116, a target database size determination module 118 and a target database provisioning module 120.

The migration plan definition module 114 is configured to obtain a migration plan for migrating data of a source database (e.g., of a first database type) to a target database (e.g., of a second database type). The migration plan may define or identify the first and second database types of the source and target databases, as well connection strings for accessing the source and/or target databases, user-defined migration factors for use in assessing the size required for the target database, etc. The migration model selection module 116 is configured to select a migration ML model (e.g., from the migration model data store 108) for use in assessing the size required for the target database. The particular migration ML model selected may be determined based at least in part on the first and second database types of the source and target databases. The target database size determination module 118 is configured to determine system-derived migration factors (e.g., based on analysis of the source and/or target databases), and to utilize such system-derived migration factors along with the user-defined migration factors as input to the selected migration ML model to determine a size needed for the target database. The target database provisioning module 120 is configured to allocate and provision sufficient storage and other resources for the target database based at least in part on the determined size which is needed for the target database. In some embodiments, the target database is provisioned with the size determined by the target database size determination module 118, possibly with some additional storage resources to provide a buffer in the case of underestimation of the size needed.

It is to be understood that the particular set of elements shown in FIG. 1 for ML-based determination of target database size for database migration operations is presented by way of illustrative example only, and in other embodiments additional or alternative elements may be used. Thus, another embodiment may include additional or alternative systems, devices and other network entities, as well as different arrangements of modules and other components.

It is to be appreciated that the particular arrangement of the database migration system 102, the ML-based target database size determination service 112, the migration plan definition module 114, the migration model selection module 116, the target database size determination module 118 and the target database provisioning module 120 illustrated in the FIG. 1 embodiment is presented by way of example only, and alternative arrangements can be used in other embodiments. As discussed above, for example, the database migration system 102, the ML-based target database size determination service 112, the migration plan definition module 114, the migration model selection module 116, the target database size determination module 118 and the target database provisioning module 120 may in some embodiments be implemented internal to one or more of the client devices 104. As another example, the functionality associated with the migration plan definition module 114, the migration model selection module 116, the target database size determination module 118 and the target database provisioning module 120 may be combined into one module, or separated across more than four modules with the multiple modules possibly being implemented with multiple distinct processors or processing devices.

At least portions of the ML-based target database size determination service 112 (e.g., the migration plan definition module 114, the migration model selection module 116, the target database size determination module 118 and the target database provisioning module 120) may be implemented at least in part in the form of software that is stored in memory and executed by a processor.

The ML-based target database size determination service 112, and other portions of the system 100, may in some embodiments be part of cloud infrastructure as will be described in further detail below. The cloud infrastructure hosting the ML-based target database size determination service 112 may also host any combination of the database migration system 102, one or more of the client devices 104, the migration model data store 108, the IT infrastructure 110, etc.

The ML-based target database size determination service 112, and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The client devices 104 and the ML-based target database size determination service 112, or components thereof (e.g., the migration plan definition module 114, the migration model selection module 116, the target database size determination module 118 and the target database provisioning module 120) may be implemented on respective distinct processing platforms, although numerous other arrangements are possible. For example, in some embodiments at least portions of the ML-based target database size determination service 112 and one or more of the client devices 104 are implemented on the same processing platform. A given client device (e.g., 104-1) can therefore be implemented at least in part within at least one processing platform that implements at least a portion of the ML-based target database size determination service 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104 and the ML-based target database size determination service 112, or portions or components thereof, to reside in different data centers. Numerous other distributed implementations are possible. The ML-based target database size determination service 112 can also be implemented in a distributed manner across multiple data centers.

Additional examples of processing platforms utilized to implement the ML-based target database size determination service 112 in illustrative embodiments will be described in more detail below in conjunction with FIGS. 7 and 8.

It is to be appreciated that these and other features of illustrative embodiments are presented by way of example only and should not be construed as limiting in any way.

An exemplary process for ML-based determination of target database size for database migration operations will now be described in more detail with reference to the flow diagram of FIG. 2. It is to be understood that this particular process is only an example, and that additional or alternative processes for ML-based determination of target database size for database migration operations can be carried out in other embodiments.

In this embodiment, the process includes steps 200 through 208. These steps are assumed to be performed by the ML-based target database size determination service 112 utilizing the migration plan definition module 114, the migration model selection module 116, the target database size determination module 118 and the target database provisioning module 120. The process begins with step 200, identifying a source database of a first database type that is to be migrated to a target database of a second database type, the second database type being different than the first database type. The first database type may comprise a relational database and the second database type may comprise a non-relational database. The first database type may comprise a Structured Query Language (SQL) database and the second database type may comprise a non SQL (NoSQL) database. The first database type may comprise a normalized Online Transaction Processing (OLTP) database and the second database type may comprise a schema-less database. A single record in the source database of the first database type may result in multiple entries in the target database of the second database type. The first database type may store data in a file format which defines data relationships between tables using identifiers, and the second database type may store data in the form of one or more compressed documents. The one or more compressed documents may comprise at least one of a document form, key-value pairs, a wide column data store, and a graph model.

In step 202, a set of one or more migration factors for migrating the source database to the target database are determined. The set of one or more migration factors may comprise at least one user-defined migration factor determined via user input and at least one system-derived migration factor determined via information collected from the source database. The set of one or more migration factors may comprise: a number of tables in the source database; a number of columns in one or more of the tables in the source database; a type of the columns in one or more of the tables in the source database; a number of records in one or more of the tables in the source database; and a total size of the source database. The set of one or more migration factors may also or alternatively comprise: a number of expected collections in the target database; and a number of expected records to be migrated from the source database to the target database. At least one of the one or more migration factors in the set of one or more migration factors may influence the size of the target database on a per-record basis.

Figure 2:
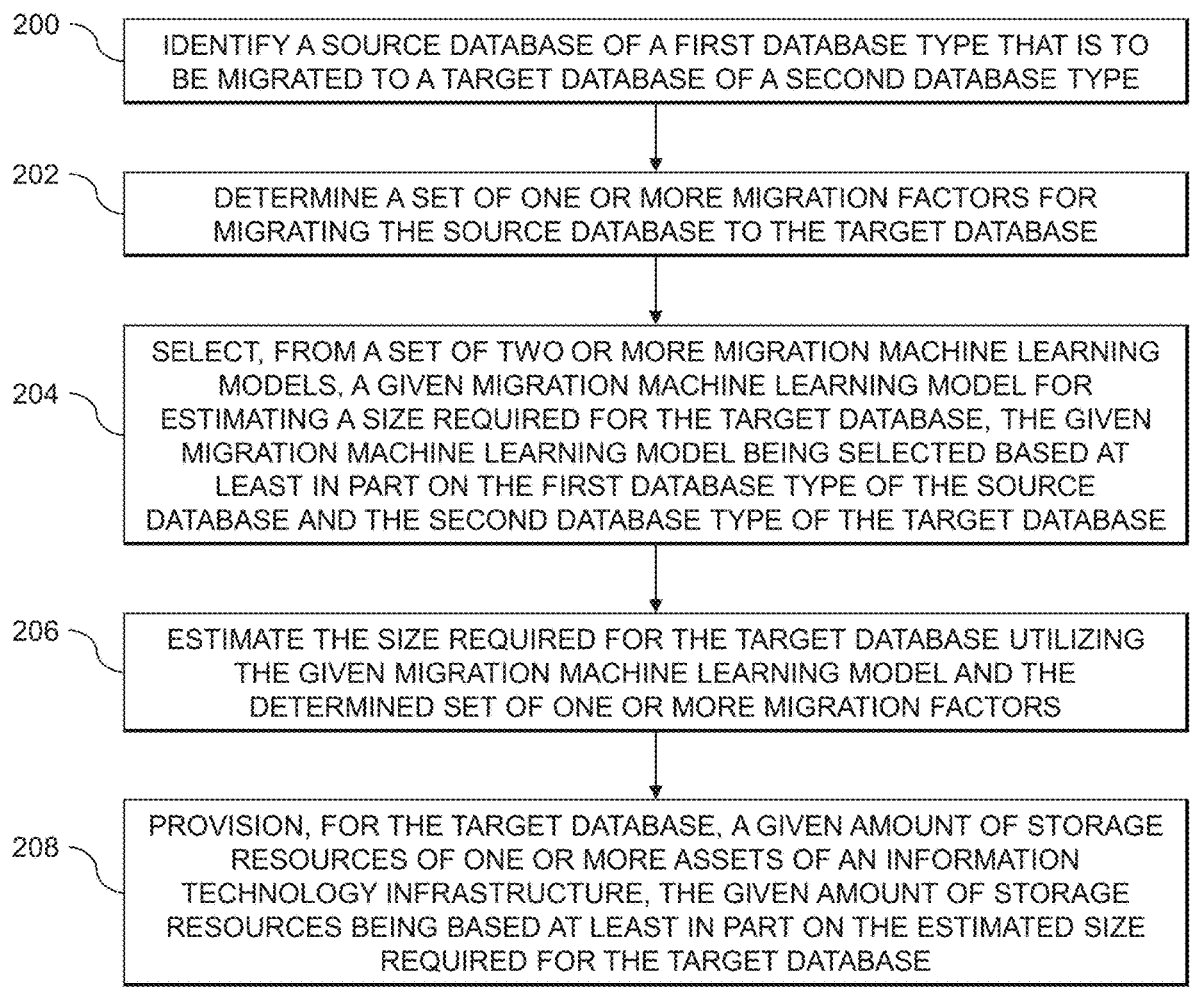
FIG. 2 is a flow diagram of an exemplary process for machine learning-based determination of target database size for database migration operations in an illustrative embodiment.

The FIG. 2 process continues with step 204 where a given migration machine learning model for estimating a size required for the target database is selected from a set of two or more migration machine learning models. The given migration machine learning model may be selected based at least in part on the first database type of the source database and the second database type of the target database. In step 206, the size required for the target database is estimated utilizing the given migration machine learning model and the determined set of one or more migration factors. In step 208, a given amount of storage resources of one or more assets of an IT infrastructure are provisioned for the target database. The given amount of storage resources is based at least in part on the estimated size required for the target database.

The given migration machine learning model selected in step 204 may be trained utilizing Multiple Linear Regression (MLR) to account for at least one of: linear size variations between the source database and the target database; and exponential size variations between the source database and the target database. The linear size variations may be determined by training a MLR algorithm with a first portion of the data of the source database and testing with a second portion of the data of the source database to determine an accuracy in two or more levels having increasing numbers of records. Responsive to the accuracy decreasing with the increasing numbers of records in the two or more levels, the exponential size variations may be determined utilizing a linear regression based at least in part on logarithmic functions of the size of records in the source database and the set of one or more migration factors.

Organizations may transition from legacy application systems to modern technologies that leverage, for example, cloud native applications as well as modern databases or cloud storage to reap the benefits of modernization. The modernization journey, however, will remain incomplete unless data is migrated to a current and relevant modern database, which may be hosted on-premises or on cloud storage. Data migration is the process of transforming extracted data from a source system and loading it on to a target system to support the whole application better with data.

Data migration, including database migration, may fail due to a number of factors. One such factor is poor capacity planning of the target database. In some modern data migration processes, data is migrated from a source database of a first database type to a target database of a second database type. The first database type may be a relational database (e.g., accessed using Structured Query Language (SQL)) while the second database type may be a non-relational database (e.g., a NoSQL database, where NoSQL means "non SQL" or "not only SQL"). The source database, for example, may be a highly normalized Online Transaction Processing (OLTP) database (e.g., Oracle, MS SQL, etc.) while the target database may be a schema-less NoSQL database (e.g., Cassandra, MongoDB, etc.).

Assessing the size of the target database which is required for a given source database is a difficult and complex task which suffers from various technical problems. Such technical problems include that the source and target databases may be different database types with different ways of storing data. The source database, as noted above, may be an OLTP database which is highly normalized and which keeps the data relationships with identifiers (IDs), while the target database may a NoSQL database which stores data in terms of compressed documents, pure documents, key-value stores, wide columns, and/or graphs. Another technical problem is that database modeling for different types of databases (e.g., OLTP databases and NoSQL databases) may be totally different. An OLTP database, for example, may keep a single relation base record for different types of views. A NoSQL database, in contrast, may be designed as needed to see in the presentation layer. Thus, one record in an OLTP database may result in multiple entries in a NoSQL database (e.g., collections in MongoDB). Due to these and other technical problems, it is difficult to assess what the size of a target database should be, including when migrating from a traditional, normalized relational database model to a modern non-relational database model. Conventional approaches rely on manual guessing or estimation ("guesstimation"), which is difficult and error prone. Illustrative embodiments provide technical solutions for an automated and intelligent way to predict the size required for a target database (e.g., a NoSQL database) using supervised artificial intelligence techniques and statistical analysis.

In digital transformation, one of the main activities is to migrate data from one or more source databases to one or more target databases. Database migration is the process of migrating data from one database to another in such a way that the data is available for applications or other clients to perform their jobs. Typical database migrations include migration from traditional normalized OLTP databases to NoSQL databases.

In an OLTP database, data is stored in ".db" file format, which has relationships defined between tables using IDs (primary key, foreign key relationships). In NoSQL databases, however, the database's files are stored in the form of compressed documents. Such compressed documents could be in pure document form, key-value pairs, wide column data store, or in a graph model. Further, in OLTP databases the data is highly normalized and is not duplicated. In NoSQL databases, however, the database model is defined by how the data needs to be represented in the presentation layer or how data is used by other clients.

Figure 3:
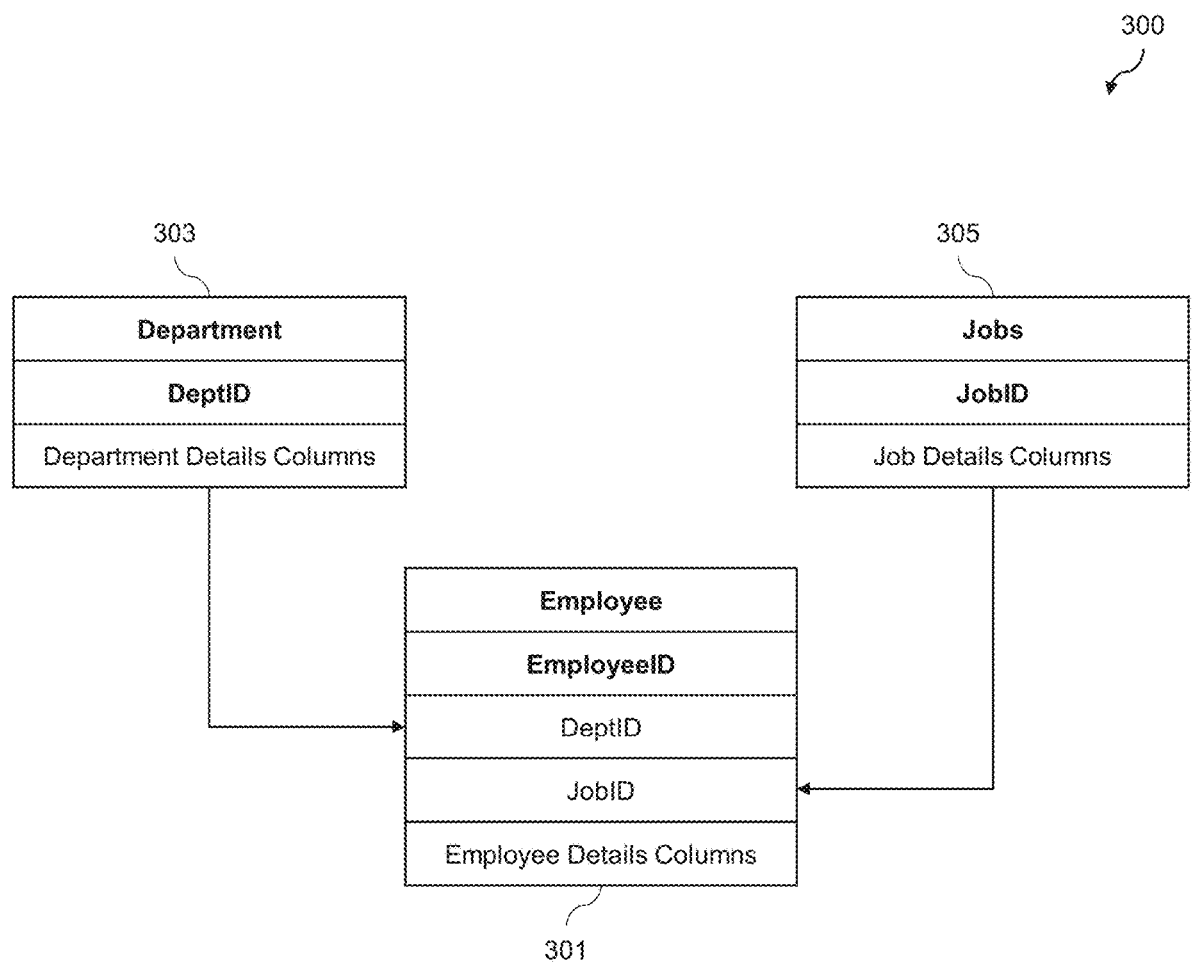
FIG. 3 shows an example of a portion of a database schema in a given database format in an illustrative embodiment.

For migration projects, an important task is to procure any needed target databases. When this is done, the capacity required for whole database migration should be specified. Because of the differences between different types of databases (e.g., OLTP databases vs. NoSQL databases), simply taking the size of the source database and saying that is what is needed for the target database will not be accurate. Consider, as an example, database migration between a source database implemented using Oracle and a target database implemented using MongoDB. For the Oracle database, assume that the data includes human resources (HR) schema with an employee table, a department table and a job table that are to be migrated to a MongoDB instance. FIG. 3 shows an example 300 of the employee table 301, the department table 303 and the jobs table 305, as well as the relations therebetween. In an Oracle database, the relation between tables is normalized as illustrated in FIG. 3. Assume that an application has three pages: a first page for showing employee details; a second page for showing employee details with department information; and a third page for showing employee details with job description information. The Oracle database stores the data in .DB files, so the database definition is pretty much static; the Oracle database will just add a greater number of rows to the existing .DB file definition or create another .DB file as reference. The Oracle database does not really care how many pages are accessing different combinations of the data, as SQL will be used to join the tables as needed to get the necessary data from the employee table 301, the department table 303 and the jobs table 305.

For MongoDB, in contrast, the information shown in the example 300 of FIG. 3 will be modeled as collections: for employee; for employee with department information; and for employee with job details. Each collection may be stored in a Binary Javascript Object Notation (BSON) format with column names repeated in each row. For a single record, the BSON format may take less space than the .DB format. However, when the data increases, the size of the MongoDB starts increasing exponentially relative to the Oracle database.

As discussed above, conventional approaches suffer from various technical problems, including that there is no systematic and automated way to assess the size required for a target database (e.g., a NoSQL database) when migrating data from a traditional SQL database. Conventional approaches which rely on humans to "guesstimate" the size needed are error prone and costly. Overestimation can result in wasted resource usage (and increased cost), while underestimation can cause the database migration process to fail.

Figure 4:
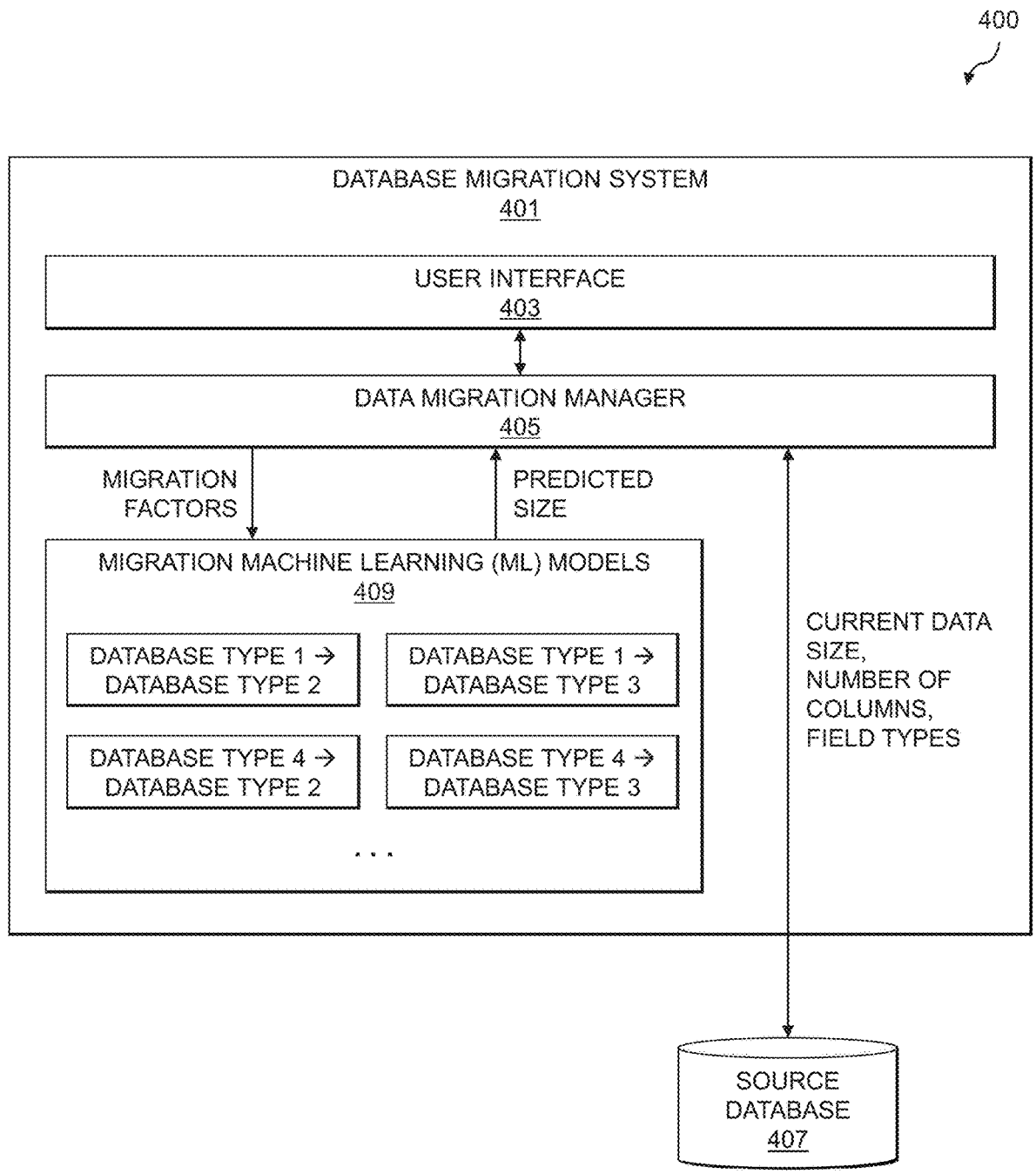
FIG. 4 shows a database migration system implementing a user interface and data migration manager in an illustrative embodiment.

The technical solutions described herein utilize ML techniques for creating models for different types of database migrations (e.g., from source database types to different target database types), such as migrations from traditional SQL databases to different types of NoSQL databases, along with dependent migration factors. The technical solutions described herein can also advantageously create adapters on the models to enable users to assess the target database size for a given source database (e.g., an existing SQL database). FIG. 4 shows an architecture 400 including a database migration system 401 which is configured with a user interface 403 and a data migration manager 405. The user interface 403 enables user interaction with the database migration system 401, including allowing a user to select the source database 407 (e.g., to be migrated), as well as a target database that the selected source database is to be migrated to. The user interface 403 also permits specification of one or more user-defined dependent migration factors, which may be configurable for different combinations of database types which are used for the selected source and target databases.

The data migration manager 405 is configured to manage database migration (e.g., from the selected source database to the selected target database). The data migration manager 405 has various responsibilities, including getting connection details from the user (e.g., via the user interface 403) and connecting to the source database 407 utilizing the obtained connection details. The data migration manager 405 is also responsible for configuring migration factors that are to be collected from the user (e.g., via the user interface 403), the source database 407, etc. The data migration manager 405, for example, may get all migration factors for a specific database migration (e.g., from a source database of a first type to a target database of a second type). The data migration manager 405 is configured to connect to the source database 407 and obtain various data therefrom, including but not limited to the current data size, table details, number of columns, type of columns, field types, etc. Different database types will have different details collected therefrom. Such details may be specified in a configuration file and is used as part of the migration factors to model. The data migration manager 405 is further configured to choose a migration ML model (e.g., from a set of migration ML models 409 maintained by the database migration system 401) and to use or run that selected migration ML model (with the dependent migration factors) to determine the estimated data size for migrating the source database 407 to a target database.

The migration ML models 409 provide a collection of supervised ML models which are trained using different data migrations (e.g., between different types of databases). For example, one migration ML model may be created for data migrations from Oracle to MongoDB, another migration ML model may be created for data migrations from Oracle to Cassandra, etc. Each of the migration ML models 409 may utilize different migration factors, which may be user-defined or system-derived (e.g., from information collected from the source and/or target database, from a specified migration plan, etc.). Migration factors represent influencing factors for determining the size for a target database. The particular migration factors will vary based on the database types of the source and target databases in a data migration process. For example, a data migration from Oracle to MongoDB may utilize the following migration factors: (1) the number of tables in the Oracle database, which is determined from the source database and may be a user-specified migration factor; (2) the number of columns in a specific table in the Oracle database, which is determined from the source database and may be a system-derived migration factor; (3) the type of columns (e.g., string, Character Large Object (CLOB), Binary Large Object (BLOB), etc.) in a specific table in the Oracle database, which is determined from the source database and may be a system-derived migration factor; (4) the number of records in one or more specific tables in the Oracle database, which is determined from the source database and may be a system-derived migration factor; (5) the total size of the Oracle database, which is determined from the source database and may be a system-derived migration factor; (6) the number of expected collections in the target MongoDB database, which may be a user-entered migration factor; and (7) the number of expected records.

Figure 5:
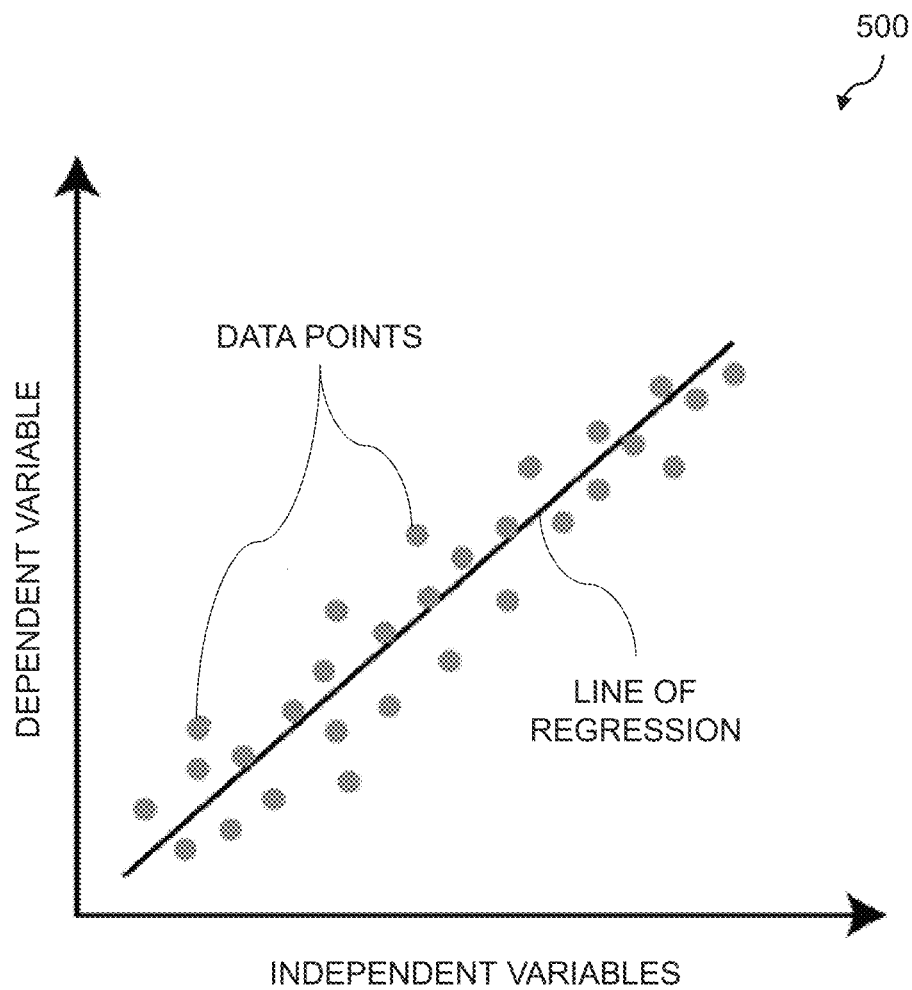
FIG. 5 shows a plot illustrating a line of regression for a set of data points with a single dependent variable and multiple independent variables in an illustrative embodiment.

Selecting a particular ML model to use for modeling migration from a source database type to a target database type will now be described. Some of the size variations between source and target databases (e.g., Oracle to Cassandra) are linear in nature. It follows that $Y=MX+C+E$, where Y is the size in the target database, C is the size for one record, X is the size in the source database, M is the set of migration factors, and E is an error factor. Since there is more than one independent variable, a Multiple Linear Regression (MLR) model may be used. FIG. 5 shows a plot 500 illustrating data points and a line of regression for the dependent variable (Y) and the set of independent variables (M, X, C, E). In some cases, the size variations between source and target databases (e.g., Oracle to MongoDB) include exponential relations. It follows that $Y=A+B^n$, where Y is the size in the target database, A is the size of a first record in the source database, B is the set of migration factors, and n is the size in the source database.

In some embodiments, the technical solutions utilize a two-step approach for finalizing the ML model used for migrating between a given source database type and a given target database type. The two-step approach may include first starting with an MLR algorithm with a first portion of the data (e.g., 70% of the data) and then testing with a second portion of the data (e.g., the remaining 30% of the data). The accuracy in different levels (e.g., different numbers of records, such as 10, 100, 1000, 10000, 100000, 1000000 records, etc.) is then evaluated. If the error increases as the size or number of records used increases, then exponential modeling may be used. Exponential modeling can be done in a linear regression model using $\log(Y)=\log(A)X+\log(B)$. Once the ML model is trained with an acceptable error range in low and high volumes of test data, the trained ML model is registered in the set of migration ML models 409.

An example of training and testing of a migration ML model will now be described with respect to test instances where the source database type is Oracle and the target database type is MongoDB. The migration factors are first defined. As described above, for migration between Oracle and MongoDB, the migration factors may include: the number of columns in a specific table in Oracle (Source DB—System Derived); the type of columns (e.g., string, CLOB, BLOB, etc.) in a specific table in Oracle (Source DB—System Derived); the number of records in Oracle tables (Source DB—System Derived); the total size of the database in Oracle (Source DB—System Derived); the number of expected collections in MongoDB (Target DB—User Entered); and the number of expected records in Mongo DB. Each migration factor is then considered and data is kept in both the Oracle and MongoDB instances, recording the size in both instances with a definite interval. Generally, the accuracy will increase if the interval is shorter and more training data is used. For example, the training and testing may start with a one column table in Oracle and one field in MongoDB, with 50,000 records (e.g., where this size may be increased or decreased). The size of both the Oracle and MongoDB instances are recorded. The training and testing may continue with adding one more column record size, then adding two columns, etc., which is repeated until some threshold is reached (e.g., up to thirty columns). The rest is left to the model to forecast. In a similar fashion, such training and testing is repeated for other identified migration factors like records (e.g., keep the column constant and add more records), collections (e.g., keep the record the same and add more collections to MongoDB); etc.

As a result of such processing, extensive data is made available for training the migration ML model. Now, MLR is used with these dependent variables and the target as size. The migration ML model is evaluated to test for the error against the actual data that is available. If the error is above some designate threshold, the smoothing of the migration ML model is adjusted. Next, a log of all dependent variables is taken and the process is repeated in MLR (e.g., which mimics exponential regression rather than linear, if the variability has exponential co-relations). The error is then tested, with adjustment and smoothing being applied to lessen or reduce the error band. A choice is then made (e.g., linear or exponential) for the specific source and target database types. The created migration ML model may then be executed for any Oracle to MongoDB migration effort. The created migration ML model may be pushed to the set of migration ML models 409 maintained by the database migration system 401, and may be registered in the data migration manager 405.

Figure 6:
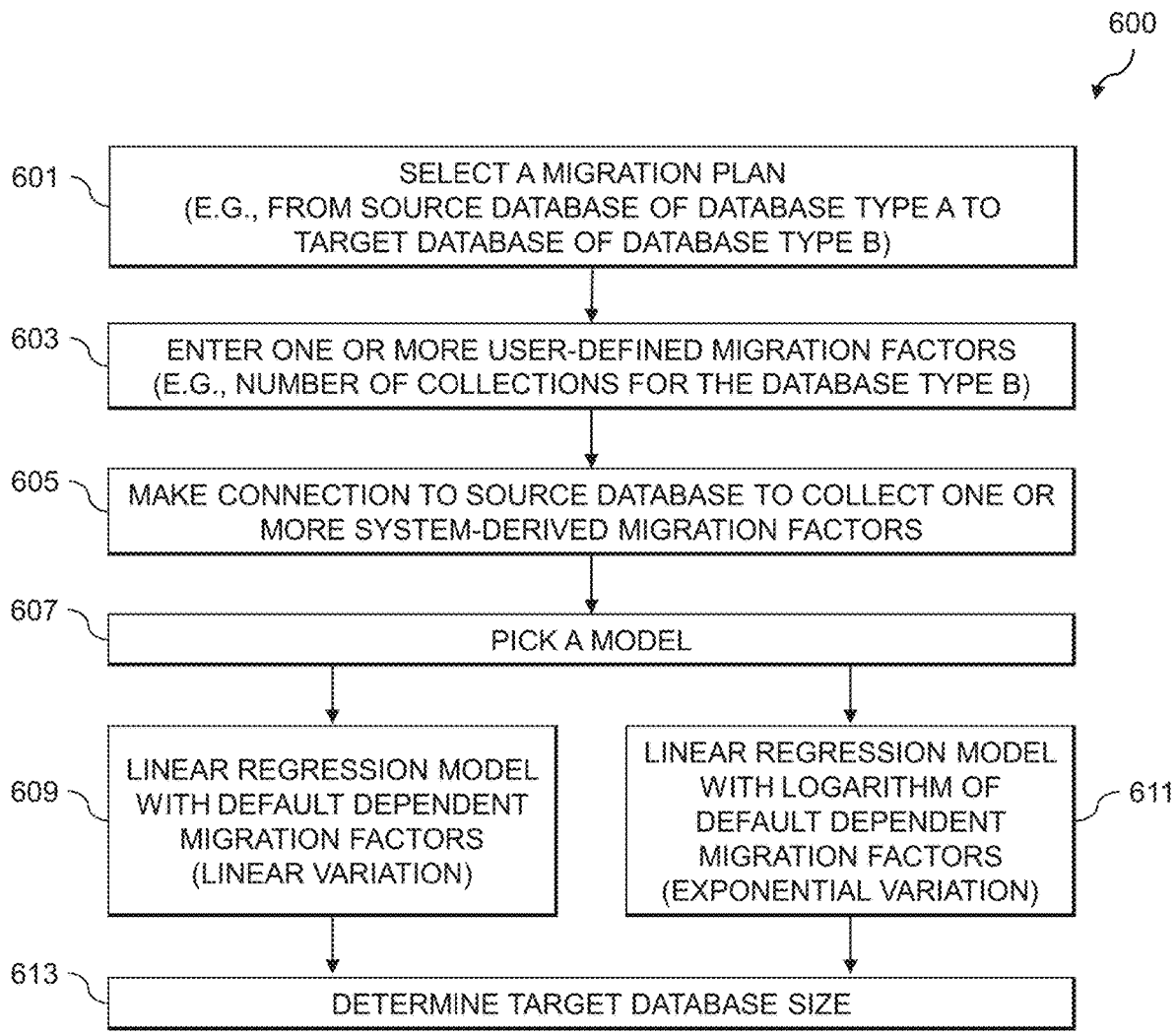
FIG. 6 shows a process flow for determining a target database size for use in migrating a source database in an illustrative embodiment.

FIG. 6 shows a process flow 600 for estimating the size of a target database utilizing the database migration system 401. The process flow 600 begins with a user utilizing the user interface 403 of the database migration system 401 to select a migration plan (e.g., for migrating from a source database of database type A to a target database of database type B, such as Oracle to MongoDB). The data migration manager 405 of the database migration system 401 will then read the configuration file for the selected migration plan, and prompts the user to enter one or more user-defined migration factors via the user interface 403 in step 603. This may also include prompting the user to enter, via the user interface 403, a source "connection string" containing information required for accessing the source database 407 having data to be migrated. The connection string may include various information, such as credentials for accessing the source database 407, a network location of the source database 407, etc. In step 605, the data migration manager 405 reads the user-defined migration factors and the connection string, and then makes a connection to the source database 407 to collect one or more additional system-derived migration factors. This may include the data migration manager 405 making a connection to the source database 407, and the data migration manager 405 reading the system-derived migration factors from the source database 407 utilizing the connection.

The data migration manager 405 in step 607 picks a correct or appropriate migration ML model (e.g., Oracle to MongDB model) from the set of migration ML models 409. In step 609, linear variation is calculated utilizing a linear regression model with the dependent migration factors. In step 611, exponential variation is calculated utilizing a linear regression model with the logarithm of the dependent migration factors. The output of the selected migration ML model (e.g., the output of step 609 and/or step 611) is then used in step 613 to determine the target database size. Advantageously, the process flow 600 provides a novel technical solution for calculating or otherwise determining the size for the target database based on a supervised ML algorithm using multi-dimension dependent parameters (e.g., the dependent migration factors) that influence the size of the target database (e.g., on a per-record basis).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for ML-based determination of target database size for database migration operations will now be described in greater detail with reference to FIGS. 7 and 8. Although described in the context of system 100, these platforms may also be used to implement at least portions of other information processing systems in other embodiments.

Figure 7:
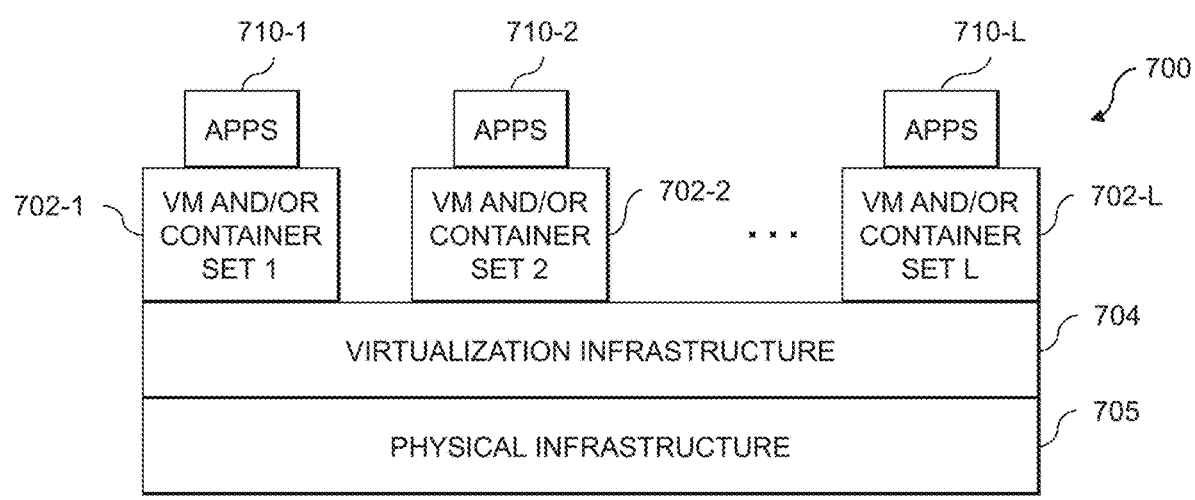
FIGS. 7 and 8 show examples of processing platforms that may be utilized to implement at least a portion of an information processing system in illustrative embodiments.
Figure 8:
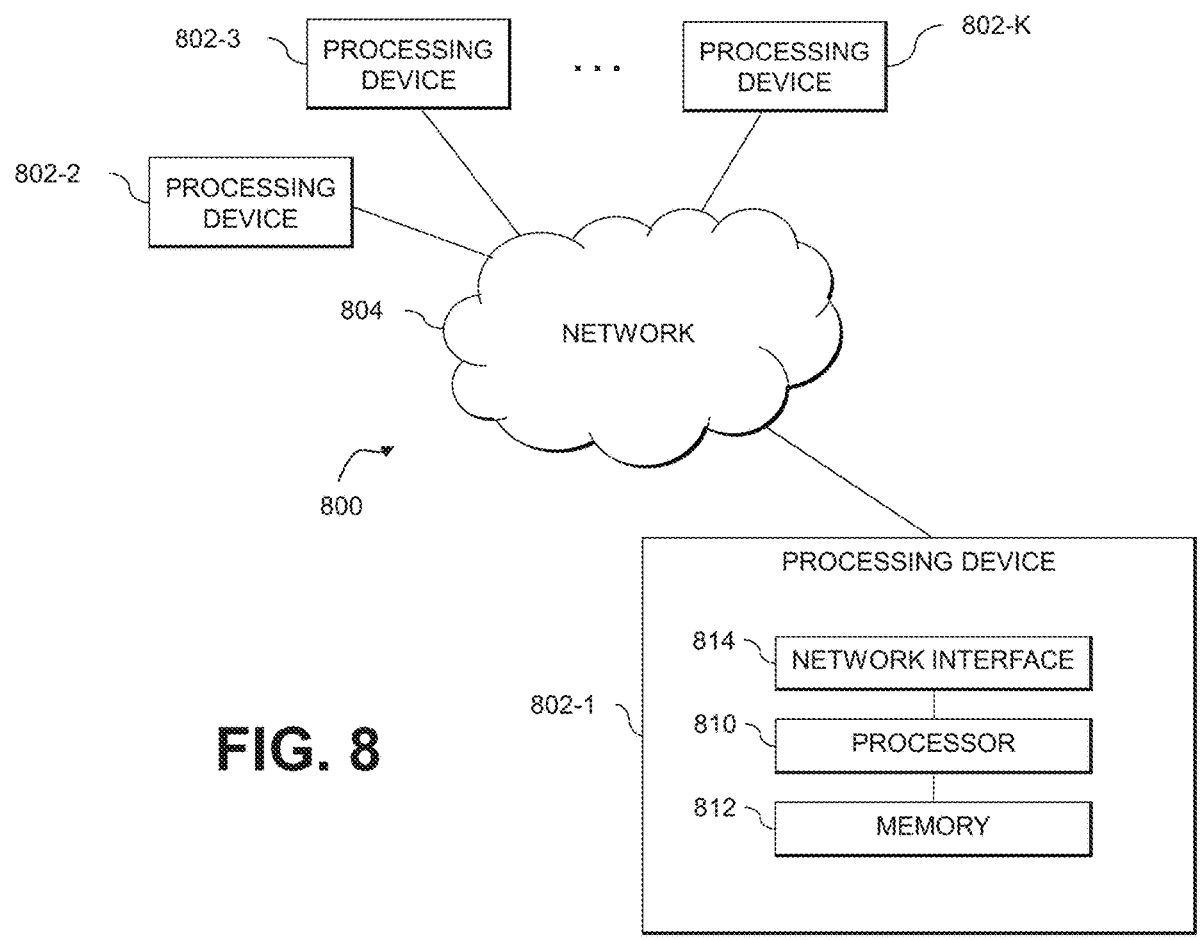

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for ML-based determination of target database size for database migration operations as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, databases, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured:
        to identify a source database of a first database type that is to be migrated to a target database of a second database type, the second database type being different than the first database type;
        to determine a set of one or more migration factors for migrating the source database to the target database;
        to select, from a set of two or more migration machine learning models, a given migration machine learning model for estimating a size required for the target database, the given migration machine learning model being selected based at least in part on the first database type of the source database and the second database type of the target database;
        to train the given migration machine learning model to account for at least one of linear size variations between the source database and the target database and exponential size variations between the source database and the target database, wherein the training is performed in two or more levels that utilize increasing numbers of records selected from the source database, and wherein the training determines whether to utilize a first type of regression or a second type of regression based at least in part on whether accuracy decreases with the increasing numbers of records selected for the source database in the two or more levels;
        to estimate the size required for the target database utilizing the given migration machine learning model and the determined set of one or more migration factors; and
        to provision, for the target database, a given amount of storage resources of one or more assets of an information technology infrastructure, the given amount of storage resources being based at least in part on the estimated size required for the target database;
    wherein the set of two or more migration machine learning models comprises:
        at least a first migration machine learning model that accounts for a first type of size variation relationship between different types of databases, the first migration machine learning model being configured for determining linear size variations between the first database type and a first set of one or more other database types; and
        at least a second migration machine learning model that accounts for a second type of size variation relationship between different types of databases, the second migration machine learning model being configured for determining exponential size variations between the first database type and a second set of one or more other database types.

2. The apparatus of claim 1 wherein the first database type comprises a relational database and the second database type comprises a non-relational database.

3. The apparatus of claim 1 wherein the first database type comprises a Structured Query Language (SQL) database and the second database type comprises a non SQL (NoSQL) database.

4. The apparatus of claim 1 wherein the first database type comprises a normalized Online Transaction Processing (OLTP) database and the second database type comprises a schema-less database.

5. The apparatus of claim 1 wherein a single record in the source database of the first database type results in multiple entries in the target database of the second database type.

6. The apparatus of claim 1 wherein the first database type stores data in a file format which defines data relationships between tables using identifiers, and wherein the second database type stores data in the form of one or more compressed documents.

7. The apparatus of claim 6 wherein the one or more compressed documents comprise at least one of a document form, key-value pairs, a wide column data store, and a graph model.

8. The apparatus of claim 1 wherein the set of one or more migration factors comprises at least one user-defined migration factor determined via user input and at least one system-derived migration factor determined via information collected from the source database.

9. The apparatus of claim 1 wherein the set of one or more migration factors comprises:
    a number of tables in the source database;
    a number of columns in one or more of the tables in the source database;
    a type of the columns in one or more of the tables in the source database;
    a number of records in one or more of the tables in the source database; and
    a total size of the source database.

10. The apparatus of claim 1 wherein the set of one or more migration factors comprises:

a number of expected collections in the target database; and a number of expected records to be migrated from the source database to the target database.

11. The apparatus of claim 1 wherein at least one of the one or more migration factors in the set of one or more migration factors influences the size of the target database on a per-record basis.

12. The apparatus of claim 1 wherein the given migration machine learning model is trained utilizing Multiple Linear Regression (MLR).

13. The apparatus of claim 12 wherein the linear size variations are determined by training a MLR algorithm with a first portion of data of the source database and testing with a second portion of the data of the source database to determine the accuracy in the two or more levels.

14. The apparatus of claim 13 wherein responsive to the accuracy decreasing with the increasing numbers of records in the two or more levels, the exponential size variations are determined utilizing a linear regression based at least in part on logarithmic functions of the size of records in the source database and the set of one or more migration factors.

15. A computer program product comprising a non-transitory processor-readable storage medium having stored therein program code of one or more software programs, wherein the program code when executed by at least one processing device causes the at least one processing device:

to identify a source database of a first database type that is to be migrated to a target database of a second database type, the second database type being different than the first database type;

to determine a set of one or more migration factors for migrating the source database to the target database;

to select, from a set of two or more migration machine learning models, a given migration machine learning model for estimating a size required for the target database, the given migration machine learning model being selected based at least in part on the first database type of the source database and the second database type of the target database;

to train the given migration machine learning model to account for at least one of linear size variations between the source database and the target database and exponential size variations between the source database and the target database, wherein the training is performed in two or more levels that utilize increasing numbers of records selected from the source database, and wherein the training determines whether to utilize a first type of regression or a second type of regression based at least in part on whether accuracy decreases with the increasing numbers of records selected for the source database in the two or more levels;

to estimate the size required for the target database utilizing the given migration machine learning model and the determined set of one or more migration factors; and to provision, for the target database, a given amount of storage resources of one or more assets of an information technology infrastructure, the given amount of storage resources being based at least in part on the estimated size required for the target database;

wherein the set of two or more migration machine learning models comprises:

at least a first migration machine learning model that accounts for a first type of size variation relationship between different types of databases, the first migration machine learning model being configured for determining linear size variations between the first database type and a first set of one or more other database types; and at least a second migration machine learning model that accounts for a second type of size variation relationship between different types of databases, the second migration machine learning model being configured for determining exponential size variations between the first database type and a second set of one or more other database types.

16. The computer program product of claim 15 wherein the first database type comprises a relational database and the second database type comprises a non-relational database.

17. The computer program product of claim 15 wherein the first database type comprises a Structured Query Language (SQL) database and the second database type comprises a non SQL (NoSQL) database.

18. A method comprising:

identifying a source database of a first database type that is to be migrated to a target database of a second database type, the second database type being different than the first database type;

determining a set of one or more migration factors for migrating the source database to the target database;

selecting, from a set of two or more migration machine learning models, a given migration machine learning model for estimating a size required for the target database, the given migration machine learning model being selected based at least in part on the first database type of the source database and the second database type of the target database;

training the given migration machine learning model to account for at least one of linear size variations between the source database and the target database and exponential size variations between the source database and the target database, wherein the training is performed in two or more levels that utilize increasing numbers of records selected from the source database, and wherein the training determines whether to utilize a first type of regression or a second type of regression based at least in part on whether accuracy decreases with the increasing numbers of records selected for the source database in the two or more levels;

estimating the size required for the target database utilizing the given migration machine learning model and the determined set of one or more migration factors; and provisioning, for the target database, a given amount of storage resources of one or more assets of an information technology infrastructure, the given amount of storage resources being based at least in part on the estimated size required for the target database;

wherein the set of two or more migration machine learning models comprises:

at least a first migration machine learning model that accounts for a first type of size variation relationship between different types of databases, the first migration machine learning model being configured for determining linear size variations between the first database type and a first set of one or more other database types; and at least a second migration machine learning model that accounts for a second type of size variation relationship between different types of databases, the second migration machine learning model being configured for determining exponential size variations between the first database type and a second set of one or more other database types; and wherein the method is performed by at least one processing device comprising a processor coupled to a memory.

19. The method of claim 18 wherein the first database type comprises a relational database and the second database type comprises a non-relational database.

20. The method of claim 18 wherein the first database type comprises a Structured Query Language (SQL) database and the second database type comprises a non SQL (NoSQL) database.

21. The method of claim 18 wherein the set of one or more migration factors comprises at least one user-defined migration factor determined via user input and at least one system-derived migration factor determined via information collected from the source database.

* * * * *